US005409100A

United States Patent [19]

Brennan

[11] Patent Number: 5,409,100

[45] Date of Patent: Apr. 25, 1995

[54] RECYCLING ASSEMBLY HAVING THREE CONVEYING BELTS

[75] Inventor: William Brennan, Lynbrook, N.Y.

[73] Assignee: Star Recycling, Inc., Brooklyn, N.Y.

[21] Appl. No.: 197,290

[22] Filed: Feb. 15, 1994

[51] Int. Cl.$^6$ ........................ B65G 15/24; B65G 17/26

[52] U.S. Cl. ...................................... 198/607; 209/911

[58] Field of Search ................ 198/607, 606; 209/692, 209/911

[56] References Cited

U.S. PATENT DOCUMENTS

| | | | |
|---|---|---|---|
| 2,151,894 | 3/1939 | Cambessedes | 198/607 X |
| 4,751,060 | 6/1988 | Kratochwill | 198/607 X |
| 5,199,575 | 4/1993 | McHugh | 209/692 X |

FOREIGN PATENT DOCUMENTS

| | | | |
|---|---|---|---|
| 1041417 | 10/1958 | Germany | 198/607 |
| 2446835 | 4/1976 | Germany | 198/607 |

*Primary Examiner*—Cheryl L. Gastineau
*Assistant Examiner*—Tuan N. Nguyen
*Attorney, Agent, or Firm*—Darby & Darby

[57] ABSTRACT

A recycling assembly includes a first endless conveyor belt, a second endless conveyor belt, a plate disposed between the first belt and the second belt and a third endless conveyor belt. An upper conveying surface of the first belt is inclined at an angle with respect to a horizontal reference plane. An upper conveying surface of the second conveyor belt is disposed at an inclined angle which is greater than the inclined angle of the upper surface of the first conveyor belt. The plate has an upper surface which is inclined with respect to the horizontal reference plane at an angle greater than the inclined angle of the upper surface of the second conveyor belt. The upper surface of the third conveyor belt is disposed at an angle which is parallel to the horizontal reference plane.

6 Claims, 1 Drawing Sheet

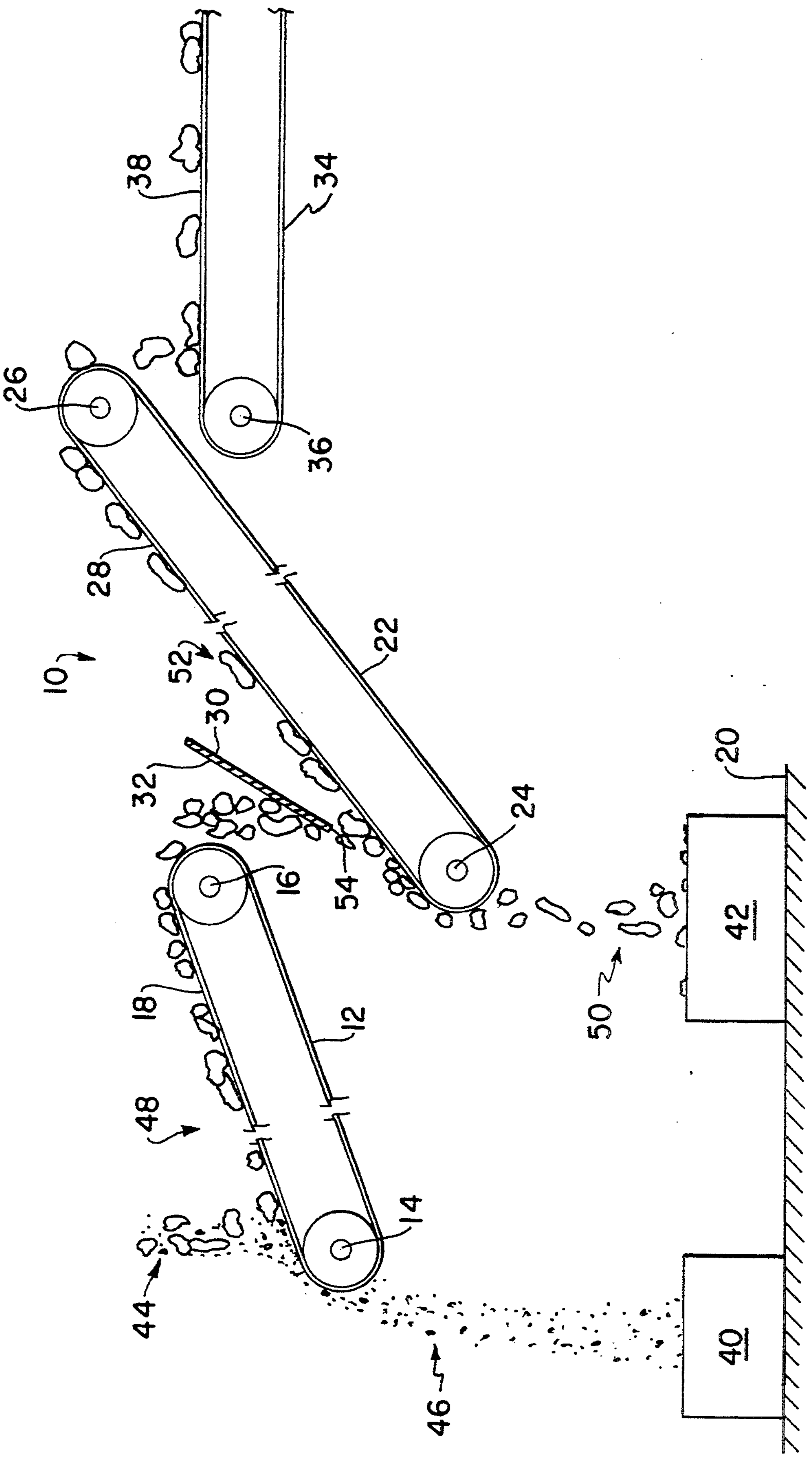
10
12
14
16
18
20
22
24
26
28
30
32
34
36
38
40
42
44
46
48
50
52
54

RECYCLING ASSEMBLY HAVING THREE CONVEYING BELTS

FIELD OF THE INVENTION

The present invention relates generally to recycling devices. More specifically, the present invention relates to recycling devices having three conveyor belts in series to reduce the amount of labor required to process the recyclable material.

BACKGROUND OF THE INVENTION

The recycling of used products such as wood, metal, stone, etc. has become more and more popular in recent years. Some recycling assemblies have the material placed on one end of an endless conveyor belt whose upper surface is disposed in a horizontal plane. Laborers stands at either or both sides of the conveyor belt and expend significant amounts of labor to remove or separate the material passing by them on the conveyor belt.

It is, therefore an object of the present invention to provide a recycling assembly that permits recyclable material to be separated while simultaneously reducing the amount of labor required from workers.

It is an object of the present invention to provide a recycling assembly that requires fewer parts and, thus, is small and easy to manufacture. It is still a further object of the present invention that the recycling assembly be simple and cost effective to manufacture, yet reliable and efficient in use.

SUMMARY OF THE INVENTION

In accordance with a preferred embodiment demonstrating further objects, features and advantages of the invention, a recycling assembly includes a first endless conveyor belt that revolves about a first end and a second end. An upper conveying surface, between the first end and the second end, is disposed at an inclined angle with respect to a horizontal reference plane. A second endless conveyor belt revolves about a first end and a second end. The second conveyor belt, has an upper conveying surface between its first end and its second end and is disposed at an inclined angle with respect to the horizontal reference plane. The first end of the second belt is disposed below the second end of the first belt. A plate is disposed between the second end of the first belt and the first end of the second belt. An upper surface of the plate is inclined with respect to the horizontal reference plane. A third endless belt, revolving about a first end and a second end, is disposed in a horizontal reference plane. The first end of the third belt is disposed below the second end of the third belt.

BRIEF DESCRIPTION OF THE DRAWING

The above and still further objects, features and advantages of the present invention will become apparent upon consideration of the following detailed description of a specific embodiment thereof, especially when taken in conjunction with the accompanying drawing wherein;

FIG. 1 is a perspective side view of a recycling system having three endless conveyor belts according to the present invention.

DETAILED DESCRIPTION OF THE PRESENTLY PREFERRED EXEMPLARY EMBODIMENT

Referring to the drawing Figure, a recycling assembly 10, according to the present invention, is illustrated. A first endless conveyor belt 12 revolves about a first end 14 and a second end 16. An upper conveying surface 18 of the first belt 12 is disposed between the first end 14 and the second end 16. The upper conveying surface 18 is disposed at an inclined angle with respect to a horizontal plane 20. In one preferred embodiment, this angle is approximately 15°-20°.

A second endless conveyor belt 22 revolves about a first end 24 and a second end 26. The second conveyor belt 22 has an upper conveying surface 28 between the first end 24 and the second end 26. The upper conveying surface 28 is disposed at an inclined angle with respect to the horizontal reference plane 20 which is preferably greater than the inclined angle of the first belt upper surface 18. In one preferred embodiment, this angle is approximately 35°-40°. The first end 24 of the second belt 22 is disposed below the second end 16 of the first belt 12; it being understood that relative orientation adjectives such as "below", "above", etc. are utilized herein to simplify the present description of the drawing Figure, and are not intended to limit the orientation of the recycling assembly.

A plate 30 is disposed between the second end 16 of the first belt 12 and the first end 24 of the second belt 22. The plate 30 has an upper surface 32 which is inclined with respect to the horizontal reference plane 20. The upper surface 32 of the plate 30 is preferably inclined at a greater angle than the upper surface 28 of the second belt 22. In one preferred embodiment, this angle is approximately 50°-55°. The lower edge 54 of plate 30 is spaced from the upper conveying surface 28 of second belt 22. In one preferred embodiment, this clearance space is approximately three inches.

A third endless conveyor belt 34 revolves about a first end 36 and a second end (not shown). A third conveyor belt has an upper conveying surface 38 between its first end 36 and its second end. The first end 36 of the third belt 34 is disposed below the second end 26 of the second belt 22. The upper surface 38 of the third belt 34 is disposed substantially in a plane which is parallel to the horizontal reference plane 20.

A first bin 40 is disposed below the first end 14 of the first conveyor belt 12. A second bin 42 is disposed below the first end 24 of the second conveyor belt 22.

The operation of the recycling assembly will be described below with reference to the drawing Figure. The recyclable material 44 typically includes a mixture of waste and reusable material. The material 44 is dropped onto the first endless conveyor belt adjacent to its first end 14 by known means. Due to the inclined angle of belt 12 and gravity, a first portion of smaller size material 46 bounces off the upper surface 18 of the first belt 12. Substantially all of this first portion of material 46 falls into bin 40. Due to the weight and density of the remaining portion of material 48, this portion comes to rest on the upper surface 18 of first belt 12. The remaining portion of material 48 is then conveyed from end 14 towards end 16 by conveyor belt 12.

The remaining portion of material 48 is transferred from the first belt 12 onto the upper surface 32 of plate 30 and then onto the upper surface 28 of the second belt 22. The portion of reusable material 48 that falls onto the second belt 22 adjacent to its first end 24 is divided into a third portion of material 50 which bounces off the second belt 22 and preferably into bin 42 and a fourth portion of material 52 which remains on the upper surface 28 of the second belt 22. The free fall transfer of material from belt 12 to belt 22 causes static friction to be removed from this portion of material 48. The inclined angles of the plate 30 and second belt 22 tend to cause the heavier and more dense material to bounce off upper surface 28 and into bin 42. The fourth portion of material 52, which tends to be lighter and less dense, comes to rest on upper surface 28. This portion of material 52 is then transferred towards the second end 26 of the second belt 22 under the lower edge 54 of plate 30 through the space between edge 54 and upper surface 28. This fourth portion of material 52 is then transferred from the second end 26 of the second belt 22 to the third conveyor belt 34, adjacent to its first end 36. At this point, workers use conventional processes to further separate this remaining fourth portion of material 52.

Applicants estimate that the present invention causes approximately fifty percent of the material 44 to be processed without the use of labor from workers. Of course, this significantly lowers the cost of recovering recyclable material because a smaller portion of the material reaches the picking line of the workers. Accordingly, fewer laborers are required to process the same amount of recyclable material.

It will be appreciated that the recyclable assembly of the present invention successfully processes and separates recyclable material at a lower cost.

From the foregoing description, it will be appreciated that the present invention makes available, a compact, cost efficient recycling assembly. Having described the presently preferred exemplary embodiment of a new and improved recycling assembly in accordance with the present invention, it is believed that other modifications, variations and changes will be suggested to those skilled in the art in view of the teaching set forth herein. It is, therefore, to be understood that all such variations, modifications and changes are believed to fall within the scope of the present invention as defined by the appended claims.

What I claim is:

1. An assembly for processing recyclable material comprising:

a first endless conveyor belt having a means for revolving about a first end and a second end, said first conveyor belt having an upper conveying surface between said first end and said second end, said upper conveying surface being disposed at an inclined angle with respect to a horizontal reference plane, said upper conveying surface having means for receiving said recyclable material and conveying said recyclable material from said first end to said second end;

a second endless conveyor belt having means for revolving about a first end and a second end, said second conveyor belt having an upper conveying surface between said first end and said second end, said upper conveying surface being disposed at an inclined angle with respect to said horizontal reference plane, said first end of said second belt being disposed below said second end of said first belt, said second belt upper conveying surface having means for conveying said recyclable material from said first end to said second end;

a plate having an upper surface, said plate being disposed between said second end of said first belt and said first end of said second belt such that substantially all of said recyclable material being conveyed from said first belt second end comes into contact with said plate upper surface and then is received on said second belt first end, said upper surface of said plate being inclined with respect to said horizontal reference plane;

a third endless conveyor belt having means for revolving about a first end, and a second end, said third conveyor belt having an upper conveying surface between said first end and said second end, said first end of said third belt being disposed below said second end of said second belt, said third belt upper conveying surface having means for conveying said recyclable material from said first end to said second end.

2. The assembly as claimed in claim 1, wherein said second belt upper surface is inclined at a greater angle than said first belt upper surface.

3. The assembly as claimed in claim 2, wherein said upper surface of said plate is inclined at a greater angle than said second belt upper surface.

4. The assembly as claimed in claim 3, wherein said third belt upper surface is disposed at a horizontal angle.

5. The assembly as claimed in claim 4, further including a first bin being disposed below said first end of said first belt.

6. The assembly as claimed in claim 5, further including a second bin being disposed below said first end of said second belt.

* * * * *